June 5, 1923.  
G. W. BERGER ET AL  
1,457,891  
SHIELD FOR SIDE CARS  
Filed May 18, 1922  
2 Sheets-Sheet 1
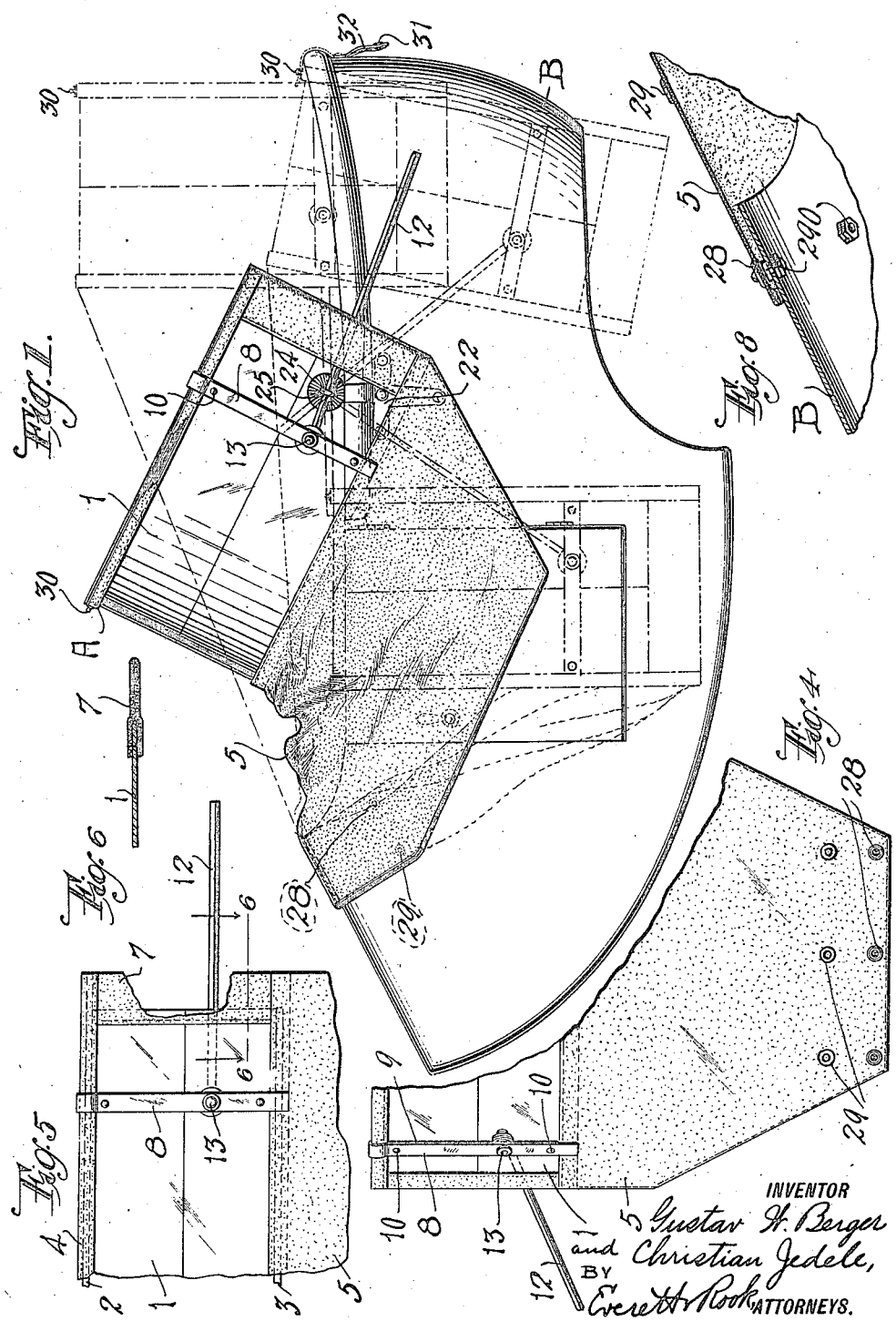

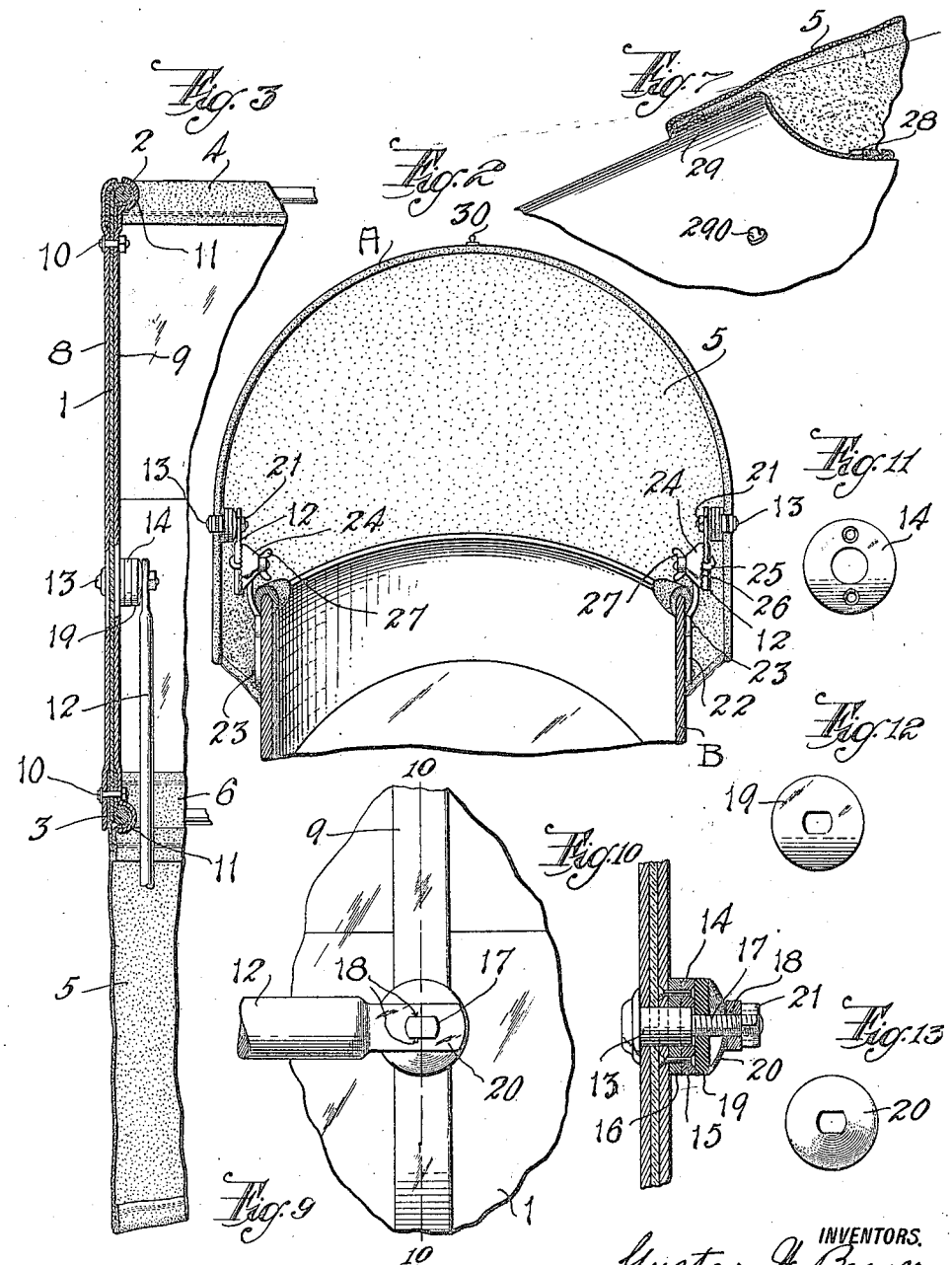

Patented June 5, 1923.

1,457,891

UNITED STATES PATENT OFFICE.

GUSTAV W. BERGER AND CHRISTIAN JEDELE, OF NEWARK, NEW JERSEY.

SHIELD FOR SIDE CARS.

Application filed May 18, 1922. Serial No. 561,921.

*To all whom it may concern:*

Be it known that we, GUSTAV W. BERGER and CHRISTIAN JEDELE, both citizens of the United States, and residents of Newark, in the county of Essex and State of New Jersey, have invented new and useful Improvements in Shields for Side Cars, of which the following is a specification.

This invention relates in general to a shield for side cars of motorcycles, and the like, one object of the invention being to provide a device which may serve as a windshield, a dust shield, or a storm shield for the occupant of the side car, and as a cover for the side car when it is vacant.

Another object of the invention is to provide a device of this character embodying novel features of construction, whereby the same may be moved or adjusted to various positions on a side car to serve in any of the above-mentioned capacities.

Further objects of the invention are to provide such a device having a transparent portion or member and a novel and improved frame construction therefor whereby the shield will withstand great pressure of wind without collapsing or materially flexing; to provide such a shield comprising a body portion and means for securing the same to a side car including a plurality of pivotal joints which cooperate with each other to enable the frame to be adjusted in a plurality of positions relative to the side car, and to obtain other results and advantages as may be brought out by the following description.

Referring to the accompanying drawings, in which like numerals of reference indicate the same parts throughout the several views, Figure 1 is a side elevation of a shield constructed in accordance with our invention showing the same applied to a side car for motorcycles, the shield being shown in solid lines in a position to serve as a windshield, and being shown in dotted and dot and dash lines in other positions;

Figure 2 is a transverse vertical sectional view through a side car showing the shield in substantially the position shown by dot and dash lines in Figure 1;

Figure 3 is an enlarged transverse sectional view through one side of the shield showing details of construction;

Figure 4 is a front elevation of the shield detached from the side car, portions being broken away;

Figure 5 is a side elevation of one end of the shield showing details of construction;

Figure 6 is a horizontal sectional view taken on the line 6—6 of Fig. 5;

Figure 7 is a fragmentary view showing the hood of the side car in side elevation and the apron of the shield in section, illustrating one manner of attaching the apron to the side car;

Figure 8 is a view similar to Figure 7 with the hood of the side car shown in section and showing another manner of connecting the apron to the side car;

Figure 9 is an enlarged side elevation of the connection of one of the supporting arms to the body portion of the shield, the nut being removed;

Figure 10 is a vertical sectional view taken on the line 10—10 of Figure 9;

Figure 11 is a plan view of one of the friction washers;

Figure 12 is a plan view of the other friction washer, and

Figure 13 is a plan view of one of the spring washers.

In the drawings the reference character A designates the upper portion of the shield which comprises a sheet 1 of flexible transparent material, preferably celluloid, carried by a metal frame comprising tempered spring steel rods 2 and 3, circular in cross-section, arranged along the longitudinal edges of the sheet 1 at one side thereof. The rod 2 and its corresponding edge of the sheet 1 are enclosed by a binding strip 4 of suitable material, such as waterproof fabric or imitation leather, and the rod 3 and its corresponding edge of the sheet 1 are enclosed by the edge of an apron 5 constituting the lower part of the body portion of the shield and formed of waterproof fabric or imitation leather, and a strip 6 of similar material. The ends of the sheet 1 are preferably enclosed by strips 7 of the same material as the apron 5 returned upon themselves and secured at opposite sides of the sheet in any suitable manner as by stitching, the said strips extending a distance beyond the ends of the sheet 1, as shown in Figures 1 and 6.

Adjacent their ends, the rods 2 and 3 are secured together by means of metal strips 8 and 9 arranged on opposite sides of the sheet 1 and extending transversely thereof. The said strips extend the full width of the frame and are secured together at their ends by bolts 10 passing through the sheet 1, and one of the strips, in the present instance the strip 9, has its ends offset at 11 to receive the rods 2 and 3, as clearly shown in Figure 3. A substantially rigid frame for the transparent sheet 1 is thus provided, said frame being flexible longitudinally, so as to be adapted to be bent or curved transversely of the side car B, as shown in Figures 1 and 2.

For the purpose of mounting the shield on the side car, a pair of rods 12 are provided which have one end thereof secured to the strips 8 and 9 of the frame by friction joints. These joints are shown as comprising bolts 13 which extend through the strips 8 and 9 and sheet 1 and are rotatable therein. A friction washer 14, preferably formed of fibre, is rigidly secured to the strip 9, preferably by rivets 15, and said washer is spaced from said strip by a spacing washer 16. Each of the bolts 13 has a portion 17 provided with flat sides 18, and a second friction washer 19 is mounted on said portion of the bolt so as to rotate therewith and frictionally engage the other friction washer 14. The end of the corresponding arm 12 is also fitted upon the end 17 of the bolt 13 to rotate with the bolt, and a spring washer 20 is interposed between the arm and the friction washer 19. A clamping nut 21 is threaded upon the outer end of the bolt 13, and by adjustment of this nut the friction between the washers 14 and 19 can be adjusted. The spring washer 20 provides a resilient or yielding friction and also tends to serve as a lock washer to prevent turning of the nut 21.

A bracket 22 is rigidly secured to each side of the side car B by any suitable means such as the fastening members 23, said brackets being provided with heads 24 which project upwardly above the edges of the side car and have eye-bolts 25 rotatable therein and extending transversely therethrough, said eye-bolts being adapted to receive the rods 12. The faces of the heads 24 adjacent the rods 12 are serrated as at 26, and the eye-bolts are provided at the side of the heads 24 opposite the eyes 25 with wing nuts 27. To mount the shield on the side car, it is merely necessary to flex the upper part A of the body portion so that the ends thereof project toward the rear of the side car, and then slip the rods 12 through the eyes of the bolts 25. The rods are then positioned in the eye-bolts at the proper place to locate the upper part A of the body portion at the desired position, after which the wing nuts 27 are tightened to draw the rods into engagement with the serrated faces 26 of the heads 24 of the brackets. The frame of the transparent sheet 1 may be adjusted by swinging the same on the joints 13, and the friction connection of the rods to said bolts will hold the frame in the adjusted position.

The apron 5 of the shield is of a length sufficient to enable the outermost edge of the frame of the upper part of the shield to reach the rear of the side car, and is of a width sufficient to overhang the sides of the side car. The extremity of the apron is adapted to be secured to the hood of the side car in any suitable manner. In the present instance the apron is provided with a plurality of inwardly facing socket members 28 adapted to cooperate with the head members 290 of the snap fasteners which are attached in any suitable manner to the hood of the side car, for instance as shown in Figure 8. The apron is also provided at a distance from its extremity with another set of socket members 29 similar to the members 28, said socket members being arranged upside down so as to face outwardly without perforating the apron and thus prevent water from entering the side car.

When the shield is intended to be used as a windshield, it is usually positioned as shown in solid lines on Figure 1, and in this position the socket members 29 are preferably utilized by folding under the extremity of the apron, as shown in Figure 4, and thereby taking up the fullness in the apron between the transparent portion A and the hood of the side car to produce a neat appearance. To use the shield as a storm shield to protect the rider or occupant of the side car from rain, the shield is preferably arranged in the position shown by dot and dash lines in Figure 1. To enable the shield to be so used, the socket members 28 are utilized so that the full length of the apron 5 is available. The shield may also be used to completely cover the opening of the side car by arranging the shield in the position shown by dotted lines in Figure 1. Preferably the outermost edge of the upper part A of the shield is provided with one section 30 of a snap fastener which is adapted to cooperate with the other section 31 carried by a flexible strap 32 secured to the rear of the side car body, said strap and fastener serving to hold the shield in the last-mentioned position, as indicated by dotted lines on Figure 1. When it is desired to place the shield out of use without taking it from the side car, the shield may be arranged as shown by dash and two dot lines in Figure 1. In this position the shield lies over the side car behind the hood thereof so as to produce substantially no resistance to the wind.

With the two pivotal connections, comprising the brackets 22 and the bolts 13 for mounting the shield on the side car, it will be obvious that the shield may be adjusted to almost any desired position relative to the side car in addition to those above described. When it is desired to leave or enter the side car, it is merely necessary to disconnect the rod 12 from the bracket 22 at the side of the car containing the door, whereupon the upper part A may be flexed outwardly so as to admit the passage to or from the side car. The rods 2 and 3 constructed and arranged as shown and described effectively prevents the upper part of the shield from bending, or collapsing inwardly of the side car against the occupant. The curvature of the upper part of the shield protects the occupant of the side car from wind, dust, and rain, from the sides as well as from the front, and also ensures that the wind deflected thereby will not be thrown against the rider of the motorcycle. Preferably, the upper portion of the transparent sheet 1 is colored to relieve the eyes of the occupant of the car from the glare of the sun.

While we have shown and described one embodiment of our invention, it will be understood that this is only for the purpose of illustrating the principles thereof, and that many modifications and changes can be made in the detail construction of the shield without departing from the spirit or scope of the invention. Therefore, we do not wish to be understood as restricting ourselves except as required by the following claims when construed in the light of the prior art.

Having thus described the invention, what we claim is:

1. A shield having a body portion adapted to extend transversely of a vehicle and free to tilt upon a line intermediate its opposite edges, and supporting means tiltingly connected to said body portion at points distant from its side and end edges and adapted to be connected to the vehicle sides, whereby the ends of the body portion may overlap the sides of the vehicle whichever way said body portion is tilted.

2. A shield having a body portion adapted to extend transversely of a vehicle and free to tilt upon a line intermediate its opposite edges, said body portion having members extending transversely of itself at a distance from its ends, and supporting means tiltingly connected to said members and adapted to be connected to the sides of the vehicle.

3. A shield having a body portion adapted to extend transversely of a vehicle and free to tilt upon a line intermediate its opposite edges, said body portion having members extending transversely of itself at a distance from its ends, and supporting means tiltingly connected to said members intermediate their ends and adapted to be connected to the sides of the vehicle.

4. A shield comprising a body portion having rods at its longitudinal margins and cross members secured to said rods at a distance from the ends of the body portion, and supporting means tiltingly connected to said members and adapted to be connected to the sides of the vehicle.

5. A shield comprising a body portion having rods at its longitudinal margins and cross members secured to said rods at a distance from the ends of the body portion, and supporting means tiltingly connected to said members intermediate their ends and adapted to be connected to the sides of the vehicle.

6. A shield having a body portion adapted to extend transversely of a vehicle in bowed relation thereto with its ends overlapping the sides of the vehicle, supporting rods connected one to each end part of the body portion so as to be angularly adjustable in a plane parallel to the end part, and means for adjustably mounting said rods on the sides of a vehicle.

7. A shield having a body portion adapted to extend transversely of a vehicle in bowed relation thereto with its end overlapping the sides of the vehicle, supporting rods connected one to each end part of the body portion so as to be angularly adjustable in a plane parallel to the end part, and means for mounting said rods on the sides of a vehicle so as to be adjustable both longitudinally and rotatably in planes parallel to the planes of their adjustment with respect to the body portion.

8. A shield having a body portion adapted to extend transversely of a vehicle in bowed relation thereto with its ends overlapping the sides of the vehicle, supporting rods connected one to each end part of the body portion so as to be angularly adjustable in a plane parallel to the end part, and pivotal clamps for adjustably mounting said rods on the sides of a vehicle.

9. A shield having a body portion adapted to extend transversely of a vehicle in bowed relation thereto with its ends overlapping the sides of the vehicle, supporting rods frictionally pivoted one to each end part of the body portion so as to swing parallel thereto, and means for adjustably supporting said rods on the vehicle sides.

10. A shield having a body portion adapted to extend transversely of a vehicle in bowed relation thereto with its ends overlapping the sides of the vehicle, supporting rods connected one to each end part of the body portion so as to be angularly adjustable in a plane parallel to the end part, and means for releasably clamping said rods on the vehicle sides so as to be adjustable both longitudinally and rotatably in planes substantially parallel to said sides.

11. A shield having a body portion adapted to extend transversely of a vehicle in bowed relation thereto with its ends overlapping the sides of the vehicle, supporting rods connected one to each end part of the body portion so as to be angularly adjustable in a plane parallel to the end part, bracket members adapted to be rigidly mounted on said vehicle, eye-bolts revolubly mounted in said brackets to receive said rods, and clamping nuts for holding said eye-bolts against revolving.

12. A shield having a body portion adapted to extend transversely of a vehicle in bowed relation thereto with its ends overlapping the sides of the vehicle, supporting rods frictionally pivoted one to each end part of the body portion so as to swing parallel thereto, bracket members adapted to be rigidly mounted on said vehicle, eye-bolts revolubly mounted in said brackets to receive said rods, and clamping nuts for holding said eye-bolts against revolving.

13. A shield of the character described comprising a body portion having a sheet of transparent flexible material therein adapted to extend transversely of a vehicle, and a flexible apron secured at one edge to one longitudinal edge of said sheet, said apron being provided adjacent its opposite edge with outwardly and inwardly facing sets of fastening members to secure the same to said vehicle, the outwardly facing set being farther from said opposite edge of the apron than the inwardly facing set so that when the outwardly facing set is in use the edge portion of the apron can be turned under and covered.

GUSTAV W. BERGER.
CHRISTIAN JEDELE.